US008553854B1

(12) United States Patent
Weaver et al.

(10) Patent No.: US 8,553,854 B1
(45) Date of Patent: Oct. 8, 2013

(54) USING VOICEPRINT TECHNOLOGY IN CALEA SURVEILLANCE

(75) Inventors: Farni B. Weaver, Spring Hill, KS (US); Irwin Joseph Butac Acosta, Kansas City, MO (US); Thomas L. Paterik, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1778 days.

(21) Appl. No.: 11/475,285

(22) Filed: Jun. 27, 2006

(51) Int. Cl.
*H04M 1/64* (2006.01)
*H04M 11/00* (2006.01)
*H04M 11/04* (2006.01)

(52) U.S. Cl.
USPC ............. 379/88.02; 379/100.05; 455/404.2

(58) Field of Classification Search
USPC ................. 379/88.01, 88.02, 33.01, 34, 38, 379/100.01, 100.05, 133; 370/351–356
See application file for complete search history.

(56) References Cited

U.S. PATENT DOCUMENTS

| | | | |
|---|---|---|---|
| 5,347,572 A | 9/1994 | Avni | |
| 5,438,570 A | 8/1995 | Karras et al. | |
| 5,897,616 A | 4/1999 | Kanevsky et al. | |
| 5,923,744 A | 7/1999 | Cheng | |
| 5,943,393 A | 8/1999 | Howell | |
| 6,311,159 B1 | 10/2001 | Van Tichelen et al. | |
| 6,324,279 B1 | 11/2001 | Kalmanek, Jr. et al. | |
| 6,438,695 B1 | 8/2002 | Maufer | |
| 6,496,483 B1 | 12/2002 | Kung et al. | |
| 6,505,157 B1 | 1/2003 | Elworthy | |
| 6,553,025 B1 | 4/2003 | Kung et al. | |
| 6,600,733 B2 | 7/2003 | Deng | |
| 6,785,651 B1 | 8/2004 | Wang | |
| 7,035,386 B1 | 4/2006 | Susen et al. | |
| 7,055,174 B1 | 5/2006 | Cope et al. | |
| 7,076,527 B2 | 7/2006 | Bellegarda et al. | |
| 7,440,900 B2 | 10/2008 | Chang | |
| 2002/0051463 A1 * | 5/2002 | Higuchi | 370/466 |
| 2002/0087316 A1 | 7/2002 | Lee et al. | |
| 2002/0184031 A1 | 12/2002 | Brittan et al. | |
| 2003/0023437 A1 | 1/2003 | Fung | |
| 2003/0190032 A1 * | 10/2003 | Ravishankar | 379/229 |
| 2003/0200311 A1 * | 10/2003 | Baum | 709/224 |
| 2004/0029564 A1 * | 2/2004 | Hodge | 455/411 |

(Continued)

OTHER PUBLICATIONS

"Diaphonics—FAQ," http://www.diaphonics.com/faq.php, printed Feb. 28, 2006.

(Continued)

*Primary Examiner* — Simon Sing
*Assistant Examiner* — Solomon Bezuayehu (57) ABSTRACT

Methods and systems are provided for using voiceprint technology in CALEA surveillance. A media-analysis platform receives packets from a bearer element, the packets comprising media data representing a copy of at least part of a real-time media session. The bearer element is configured to initially send to the platform a copy of each of a plurality of media sessions that traverse the bearer element, and to stop sending a copy of a particular session in response to receiving an instruction from the platform. Responsive to receiving the packets, the platform compares the media data to at least one media-data profile, where each profile is associated with a target of surveillance. The platform determines whether the data matches any of the profiles. If the data does not match any of the profiles, the platform sends an instruction to the bearer element to stop sending the copy of the session.

16 Claims, 5 Drawing Sheets

(56) References Cited

U.S. PATENT DOCUMENTS

| | | | |
|---|---|---|---|
| 2004/0186730 | A1 | 9/2004 | Sun et al. |
| 2004/0199596 | A1 | 10/2004 | Nutkis |
| 2004/0249636 | A1 | 12/2004 | Applebaum et al. |
| 2005/0132414 | A1* | 6/2005 | Bentley et al. ............ 725/105 |
| 2005/0243802 | A1* | 11/2005 | Barclay et al. ............ 370/352 |
| 2006/0053010 | A1 | 3/2006 | Chapman et al. |
| 2006/0067497 | A1 | 3/2006 | Erhart et al. |
| 2006/0133595 | A1* | 6/2006 | Ravishankar ............ 379/229 |
| 2006/0149558 | A1 | 7/2006 | Kahn et al. |
| 2006/0217136 | A1* | 9/2006 | Bantukul et al. ............ 455/466 |
| 2006/0293876 | A1 | 12/2006 | Kamatani et al. |
| 2007/0041517 | A1* | 2/2007 | Clarke et al. ............ 379/67.1 |
| 2008/0285726 | A1* | 11/2008 | Kung et al. ............ 379/32.01 |

OTHER PUBLICATIONS

Castle, "Multi-Billion Pound Global Surveillance," http://www.cephasministry.com/nwo_digital_monitoring.html, Jan. 28, 2000.

Final Office Action from U.S. Appl. No. 11/555,584, mailed Apr. 5, 2011.

ADC Adaptive Communications—SMserver, IP CALEAserver, http://www.adc-adapts.com/Products/ipscaleaserver/architecture.cfm, from World Wide Web on Feb. 21, 2001.

ADC Adaptive Communications—SMserver, IP CALEAserver, http://www.adc-adapts.com/Products/ipscaleaserver/features.cfm, from World Wide Web on Feb. 21, 2001.

ADC Adaptive Communications—SMserver, IP CALEAserver, http://www.adc-adapts.com/Products/ipscaleaserver/overview.cfm, from World Wide Web on Feb. 21, 2001.

Hobbs, "The Role and Structure of a Theory of Discourse," Sep. 5, 2003.

Liddy, "Natural Language Processing", 2001.

NewNet Product Family, NewNet IP CALEserver, http://www.newnet.com/products/ipcaleaserver/, printed from the World Wide Web on Jan. 8, 2001.

Unpublished U.S. Appl. No. 11/555,584, filed Nov. 1, 2006 in the name of Paterik et al., entitled "Natural-Language Surveillance of Packet-Based Communications".

Non-Final Office Action from U.S. Appl. No. 11/555,584, mailed Nov. 15, 2010.

Non-Final Office Action from U.S. Appl. No. 09/793,176, mailed Sep. 7, 2004.

Final Office Action from U.S. Appl. No. 09/793,176, mailed Feb. 8, 2005.

Advisory Action from U.S. Appl. No. 09/793,176, mailed Apr. 18, 2005.

Non-Final Action from U.S. Appl. No. 09/793,176, mailed Aug. 5, 2005.

Notice of Allowance from U.S. Appl. No. 09/793,176, mailed Jan. 6, 2006.

Notice of Allowance mailed Aug. 25, 2011 for U.S. Appl. No. 11/555,584.

* cited by examiner

USING VOICEPRINT TECHNOLOGY IN CALEA SURVEILLANCE

BACKGROUND

1. Technical Field

The present invention relates to packet-based communication sessions, such as Voice over Internet Protocol sessions, and, more particularly, to conducting surveillance with respect to such sessions.

2. Description of Related Art

Given the recent rise in popularity of the Internet and packet-switched communications generally, it is becoming more and more common for people to engage in packet-based, real-time media sessions over packet-switched networks rather than, for example, more traditional circuit-switched telephone communication sessions. These real-time media sessions may take the form of Voice over Internet Protocol (VoIP) sessions, and/or any other type of real-time media sessions. To engage in these sessions, communication devices may use a packet-switched protocol such as the Internet Protocol (IP), relevant aspects of which are described in "Internet Protocol," RFC 791 (September 1981), which is incorporated herein by reference.

Certain types of real-time media sessions, such as VoIP sessions, may be set up using a protocol such as the Session Initiation Protocol (SIP), relevant aspects of which are described in Rosenberg et al., "SIP: Session Initiation Protocol," RFC 3261 (June 2002), which is incorporated herein by reference. The SIP messages involved in setting up these packet-data communication sessions may include description of one or more parameters of those sessions according to a protocol known as the Session Description Protocol (SDP), relevant aspects of which are described in Handley and Jacobson, "SDP: Session Description Protocol," RFC 2327 (April 1998), which is incorporated herein by reference.

Once the session parameters have been agreed upon by the session participants, the session may be conducted using a bearer protocol—and via one or more bearer elements such as routers, switches, media servers, media gateways, etc.—such as the Real-time Transport Protocol (RTP), relevant aspects of which are described in Schulzrinne et al., "RTP: A Transport Protocol for Real-Time Applications," RFC 3550 (July 2003), which is incorporated herein by reference. Many other protocols may be used instead of or in addition to SIP, SDP, and RTP, however.

With respect to communication sessions in general, whether they be circuit-switched or packet-switched, it sometimes occurs that law-enforcement agencies need to and are authorized to monitor them. Along these lines, on Oct. 25, 1994, the United States government enacted the Communications Assistance for Law Enforcement Act, or CALEA, to clarify the duty of telecommunications carriers to cooperate in monitoring communications for law-enforcement purposes. CALEA requires these carriers (e.g., telephone companies, wireless service providers, etc.) to make available both call content (voice signals) and call data (digits dialed, length of call, etc.) to requesting law-enforcement agencies in response to a valid court order.

Among the known techniques for conducting surveillance of communications are both speaker verification and speaker identification. Speaker verification refers to comparing a voice sample against a stored digital representation—often known as a voiceprint—of a person's voice, for the purpose of verifying the identity of the speaker. This is often most useful alongside some identity-corroborating data, such as a name, account number, and the like. Speaker identification involves comparing a voice sample against multiple voiceprints, to determine the identity of the speaker, and is often used when no identity-corroborating data is available.

SUMMARY

Methods are provided for using voiceprint technology in CALEA surveillance. According to the present invention, a network entity referred to herein as a media-analysis platform maintains a set of media-data profiles. One example of media data is voice data, and, accordingly, one example of a media-data profile is a voice-data profile, or voiceprint. Basically, a voiceprint is a collection of data that is characteristic of a particular person's voice, and thus can be used to identify a particular voice as that person's voice.

Furthermore, a bearer element such as a media server is configured to send a copy of all—or all of a particular plurality of—media sessions that traverse the bearer element to the media-analysis platform. As an example, these media sessions could be VoIP sessions. The media-analysis platform then compares each media session against the stored media-data profiles. These profiles are each associated with a target of lawful surveillance. For example, each profile could be a voiceprint of a person for whom a surveillance-authorizing court order has been obtained by a law-enforcement agency such as a police department or the FBI.

If the media-analysis platform determines that a particular media session does not match any of the stored profiles, the media-analysis platform responsively instructs the bearer element to stop sending a copy of that session to the media-analysis platform. Responsive to that instruction, the bearer element no longer sends a copy of that particular session to the media-analysis platform. Thus, surveillance of that session appropriately stops.

In one aspect of the present invention, then, an exemplary embodiment may take the form of a method. In accordance with the method, a media-analysis platform receives at least one packet from a bearer element. The at least one packet comprises media data representing a copy of at least part of a real-time media session. The bearer element is configured to (i) initially send to the media-analysis platform a copy of each of a plurality of media sessions that traverse the bearer element and (ii) stop sending a copy of a particular session to the media-analysis platform in response to receiving an instruction from the media-analysis platform.

Responsive to receiving the at least one packet, the media-analysis platform compares the media data to at least one media-data profile maintained by the media-analysis platform. Each profile is associated with a target of surveillance. The media-analysis platform determines whether the media data matches any of the at least one profile. If the media-analysis platform determines that the media data does not match any of the at least one profile, the media-analysis platform responsively sends an instruction to the bearer element to stop sending the copy of the media session to the media-analysis platform.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

As presently contemplated, two network devices, referred to herein as a media-analysis platform and a bearer element, will—alone and/or together—carry out exemplary embodiments of the present invention, according to which some or all of the real-time media sessions that traverse the bearer element will be checked to determine whether a match exists between (i) one or more participants in the respective session and (ii) one or more media-data profiles maintained by the media-analysis platform. For those sessions where it is determined that no match exists, surveillance will stop. For those where such a match does exist, surveillance may continue.

Note that the exemplary embodiments will largely be described with respect to the media sessions being voice sessions, VoIP sessions in particular. However, the present invention is not limited to VoIP sessions, voiceprints, and so forth. The relevant media data could include video data, and/or any other type of real-time media data. In the case of video data, facial recognition may be performed. And other biometric data may be similarly screened. For example, a person's thumbprint could be digitally represented in a profile, and real-time media sessions could be tested for matches to this profile, assuming that the corresponding thumbprint data was made part of the session, perhaps as a result of a visual scan of one or more of the media-session participants' thumbprints by suitably-equipped communication devices.

Using VoIP sessions and voiceprint analysis for illustration, the media-analysis platform may be referred to as a voice-analysis platform, and may be a network server having a communication interface, a processor, and data storage. Among the data maintained in the data storage may be one or more voice-data profiles (voiceprints), as well as program instructions executable by the processor for carrying out the voice-analysis-platform functions described herein. Each voiceprint may be a set of data that digitally represents various characteristics of a particular person's voice, such that the voiceprint may be used to identify a particular voice as that person's voice. Each voiceprint may be associated with a target of surveillance, and thus may be stored along with a person's name, or maybe some other identifier in cases where law-enforcement officials have identified a person for surveillance but do not yet know their name.

The bearer element may be any network device that acts as a conduit for these VoIP sessions. Thus, the bearer element could be a switch, a router, a media server, and/or any other type of network element that the VoIP sessions traverse between their various participants. The bearer element may, like the voice-analysis platform, have a communication interface, a processor, and data storage. Though the bearer element's data storage may include any type of data to facilitate operation as a bearer element, it may at a minimum include program instructions executable by the processor for carrying out the bearer-element functions described herein. Bear in mind as well that the media-analysis platform and the bearer element could be functional components of a single network device.

In operation, the bearer element initially sends a copy of all of a plurality of the VoIP sessions that traverse the bearer element to the media-analysis platform. This plurality could be all of the VoIP sessions that traverse the bearer element. Perhaps coextensively, perhaps not, this plurality could be all VoIP sessions that originate and/or terminate in a particular geographic area. As another possibility, this plurality of VoIP sessions could be all of the VoIP sessions that traverse some other bearer element. Thus, the bearer element in question could recognize VoIP sessions that have traversed that second bearer element, and responsively initially send a copy of all of those VoIP sessions to the media-analysis platform.

The media-analysis platform then compares the voice data associated with each VoIP session against the stored digitized voiceprints. If the media-analysis platform determines that a particular session does not match any of the voiceprints, and thus does not involve a target of surveillance, the media-analysis platform sends an instruction to the bearer element to stop sending a copy of that particular session to the media-analysis platform. Surveillance of that session is thus appropriately stopped. If however, a match is found, the media-analysis platform may take one of a number of steps, such as recording the session, alerting a law-enforcement agency, forwarding the particular session to a law-enforcement agency via a circuit-switched or packet-switched connection, and/or any other appropriate responsive steps.

With respect to how a particular VoIP session is compared with stored voiceprints, one component of the analysis may involve the voiceprints having data that characterize how particular people pronounce certain phonemes, and then searching the VoIP session for a participant that matches pronunciation for a sufficient number of phonemes of a given profile, such that that number of matches is statistically significant (i.e., not random). Phonemes are essentially the building-block sounds of a particular language. For example, the words "cool" and "keel" both begin with a sound that could be characterized as a "hard k" sound. Thus, these words are categorized as starting with the same phoneme, in spite of the fact that they begin with different letters of the alphabet. The word "chord" is another example of a word whose pronunciation properly starts with this particular phoneme (this time spelled "ch").

Thus, the present invention moves beyond the traditional approach of treating particular telephone numbers as the functional targets of surveillance, to instead focusing on particular voiceprints. Thus, a suspect's conversations may be monitored even if the suspect does not always place or receive calls using the same phone number. This may result in more effective surveillance, assuming the relevant warrants permit the surveillance contemplated herein.

2. Exemplary Architecture a. Exemplary Communication System

Figure 1:
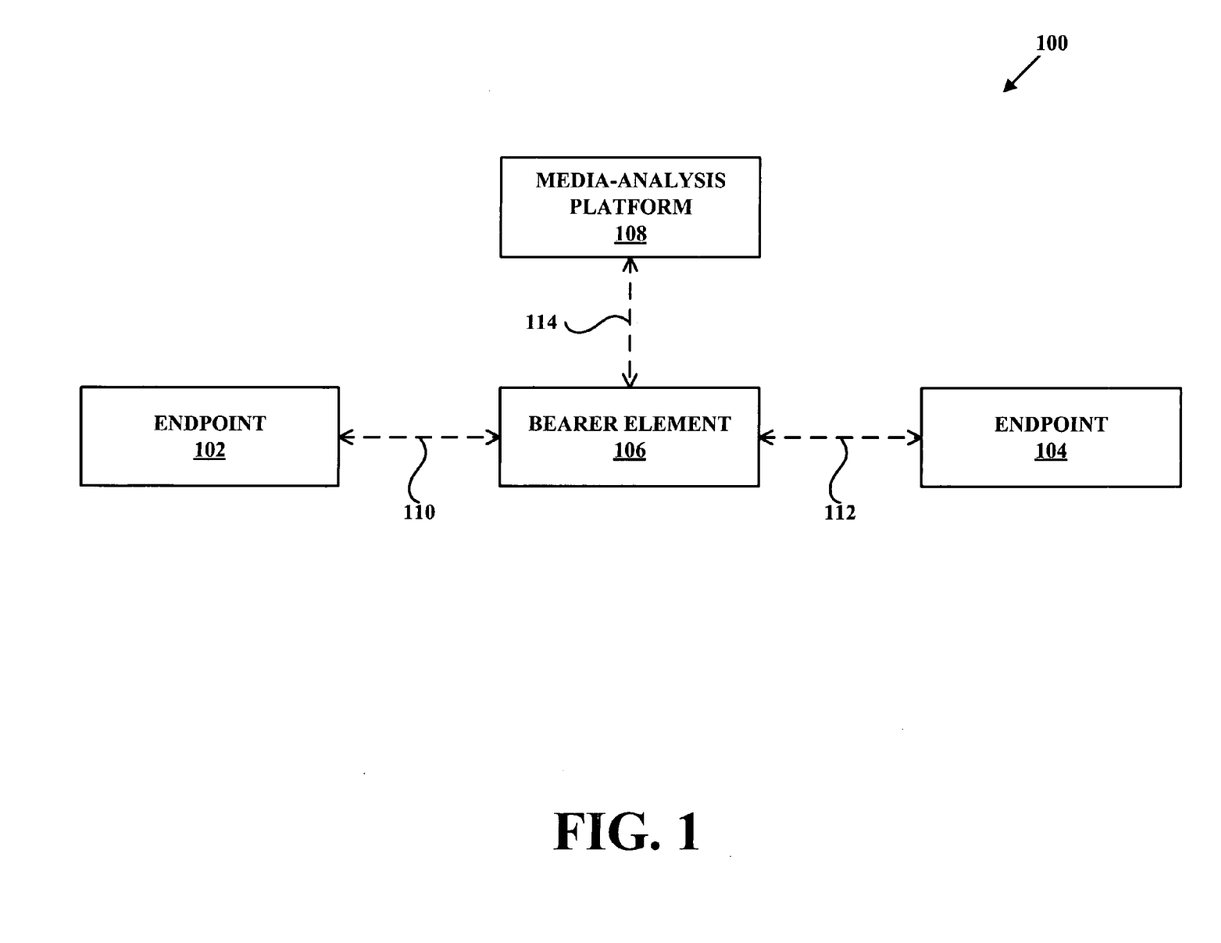
FIG. 1 is a simplified block diagram of a communication system that may be used in accordance with exemplary embodiments.

FIG. 1 is a simplified block diagram of a communication system that may be used in accordance with exemplary embodiments. It should be understood that this and other arrangements described herein are set forth only as examples.

Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes endpoints 102 and 104, a bearer element 106, and a media-analysis platform 108. Endpoint 102 and bearer element 106 are able to communicate over a communication link 110; endpoint 104 and bearer element 106 are able to communicate over a communication link 112; bearer element 106 and media-analysis platform 108 are able to communicate over a communication link 114. And more devices than those shown in FIG. 1 may be involved in carrying out exemplary embodiments of the present invention. For example, numerous switches, routers, networks, etc. may be involved.

The communication links 110, 112, and 114 are logical links that represent the fact that the entities joined by those links may exchange packet data with each other over one or more packet-switched networks, one or more circuit-switched networks, one or more wired networks, one or more wireless networks, one or more private networks, and/or one or more public networks such as the Internet. These entities may exchange packet-data using IP, and may each be identified by one or more IP addresses. In one embodiment, all four devices in FIG. 1 may be connected to the same packet-switched network, such as the Internet.

Endpoints 102 and 104 may be any type of networking devices capable of engaging in real-time media sessions, such as VoIP sessions. As such, either or both of endpoint 102 and endpoint 104 could be a mobile station such as a cellular telephone, a multi-mode device, or a PDA. Endpoints 102 and 104 may connect to bearer element 106 via communication links 110 and 112, respectively. As further examples, either or both of endpoint 102 and endpoint 104 could be a packet-based telephone, a computer, a media gateway, a server, a push-to-talk (PTT) server, or a conference server. Other possibilities exist as well.

Bearer element 106 may be a network server—or any other suitable networking device—having a communication interface such as an Ethernet interface, a processor, and data storage comprising program instructions executable by the processor for carrying out the bearer-element functions described herein. As examples, bearer element 106 could include a switch, a router, a media gateway, a media server, and/or a packet data serving node (PDSN).

Similarly, media-analysis platform 108 may be a network server—or any other suitable networking device—having a communication interface such as an Ethernet interface, a processor, and data storage comprising program instructions executable by the processor for carrying out the media-analysis-platform functions described herein. Media-analysis platform 108 may also store at least one media-data profile for comparison with the media data associated with various real-time media sessions.

In the case of media-analysis platform 108 analyzing voice data, the real-time media sessions could be real-time voice sessions (such as VoIP sessions), and the media-data profiles stored by media-analysis platform could include voice-data profiles such as voiceprints. In that case, media-analysis platform 108 could be referred to—or referred to as including—a voice-analysis platform. A parallel characterization of media-data platform 108 could be made with respect to video data: that is, the real-time media sessions could be or include real-time video sessions, the media-data profiles could be or include video-data profiles, and media-analysis platform 108 could be referred to—or referred to as including—a video-analysis platform. As one example of video analysis, facial-recognition techniques could be performed.

b. Exemplary Media-Analysis Platform

Figure 2:
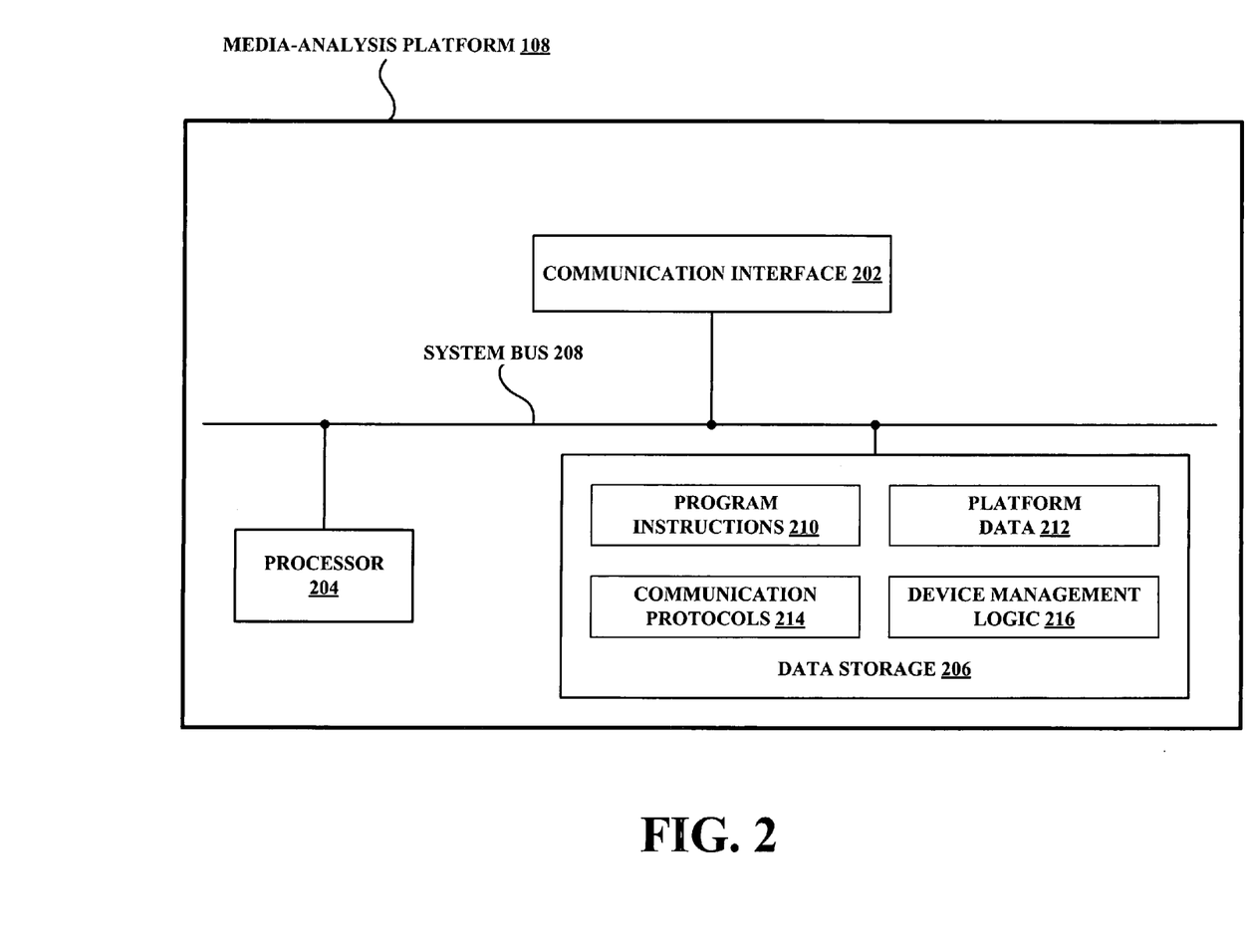
FIG. 2 is a simplified block diagram of an exemplary media-analysis platform, which may be used in accordance with exemplary embodiments.

FIG. 2 is a simplified block diagram of an exemplary media-analysis platform, which may be used in accordance with exemplary embodiments. In particular, FIG. 2 shows that media-analysis platform 108 includes a communication interface 202, a processor 204, and data storage 206, all of which may be communicatively linked by a system bus 208. In general, media-analysis platform may be any networking device configured to carry out the media-analysis-platform functions described herein. As examples, media-analysis platform 108 could be a server, a switch, a router, a media server, and/or a media gateway. Furthermore, bearer element 106 may have a structure that is generally similar to the structure described in connection with media-analysis platform 108.

Communication interface 202 may be any combination of hardware and software that media-analysis platform 108 uses to communicate with bearer element 106. Communication interface 202 may thus include an Ethernet card and/or any other type of hardware or software. In some embodiments, media-analysis platform 108 may communicate wirelessly with bearer element 106, in which case communication interface 202 may include a wireless-communication chipset and perhaps an antenna.

Processor 204 may comprise multiple (e.g., parallel) processors, such as a general purpose microprocessor and/or a discrete digital signal processor. Data storage 206 may take various forms, in one or more parts, such as a non-volatile storage block and/or a removable storage medium. Data storage 206 may store program instructions 210, platform data 212, communication protocols 214, and device management logic 216. Program instructions 210 may be executable by processor 204 to carry out various media-analysis-platform functions described herein. Platform data 212 may include correlations—such as the correlations described below in connection with FIG. 3—between media-data profiles and identities of targets of surveillance. Furthermore, platform data 212 may include any other types or combinations of data that facilitate carrying out exemplary embodiments, as well as any other types of data.

Communication protocols 214 may be useful to receive data from and send data to one or more network entities, and may include any protocols mentioned herein, any proprietary protocols, and/or any other protocols. Compatible protocols may be stored in other entities in communication with media-analysis platform 108. Device management logic 216 may be used to manage aspects of media-analysis platform 108 such as memory and file management.

As stated above, media-analysis platform 108 may be or include any of a number of types of media-analysis platforms. As two examples, media-analysis platform 108 could be or include a voice-analysis platform and/or a video-analysis platform. In the case of media-analysis platform 108 including voice-analysis capability, it may correspondingly be the case that media-analysis platform 108 maintains at least one media-data profile that includes voice data, such as a voiceprint. In that scenario, the media session that media-analysis platform 108 may analyze may include voice data as or among the session's media data.

Similarly, in the case of media-analysis platform 108 including video-analysis capability, it may correspondingly be the case that media-analysis platform 108 maintains at least one media-data profile that includes video data. In that scenario, the media session that media-analysis platform 108 may analyze may include video data among the session's media data. One application of this scenario may be to perform facial-recognition techniques on one or more participants in the media session. Note that the video data may be or include still images.

c. Exemplary Voiceprint Data

Figure 3:
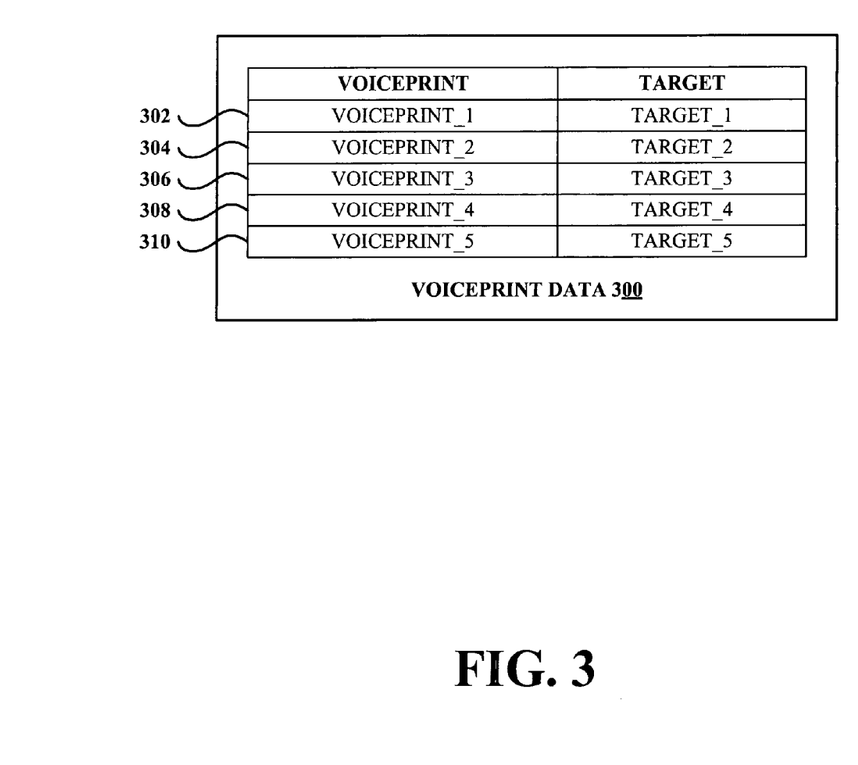
FIG. 3 is a simplified block diagram of exemplary voiceprint data, which may be used in accordance with exemplary embodiments.

FIG. 3 is a simplified block diagram of exemplary voiceprint data, which may be used in accordance with exemplary embodiments. In particular, FIG. 3 depicts a set of voiceprint data 300 that may be stored as platform data 212, and that correlates media-data profiles such as voiceprints with identities of targets of surveillance. Voiceprint data 300 is merely an example of one way to correlate media-data profiles with surveillance-target identities, and other ways could be used as well without departing from the spirit and scope of the present invention.

Also, any number of correlations could be maintained; FIG. 3 depicts five as an example. Specifically, row 302 shows a voiceprint (represented as VOICEPRINT_1) correlated with an identifier or identity of a first target of surveillance (represented as TARGET_1). Rows 304 through 310 show VOICEPRINT_2 through VOICEPRINT_5 respectively associated with TARGET_2 through TARGET_5.

The voiceprint data maintained by media-analysis platform 108 may take any of a number of forms known in the art for digitally representing characteristics of a particular person's voice. One example, discussed above, would be to include data that indicates how a particular person pronounces certain phonemes, which again are the building-block sounds of spoken language. However, any other types of data that indicate characteristics of a person's voice may be included instead or in addition.

Furthermore, the surveillance-target information maintained by media-analysis platform 108 in voiceprint data 300 could take any of a number of forms as well. In general, this target data serves the purpose of identifying a particular target of surveillance, whether or not that target's actual identity is known. Thus, this data could include one or more names, one or more nicknames, one or more known associates, a social security number, one or more identifiers assigned to an at-that-time anonymous voiceprint, and/or any other types of data.

Furthermore, as explained herein, the present invention is not limited to voiceprint data, which is an illustrative and likely commonly-used application. Any other type or types of media data could be maintained by media-analysis platform 108 instead of or in addition to voiceprint data. One example already mentioned herein would be video data, which could be used to perform facial-recognition techniques. Other biometric data such as thumbprint or fingerprint data could be included, for use in identifying media sessions that involve targets of surveillance.

3. Exemplary Operation a. A First Exemplary Method

Figure 4:
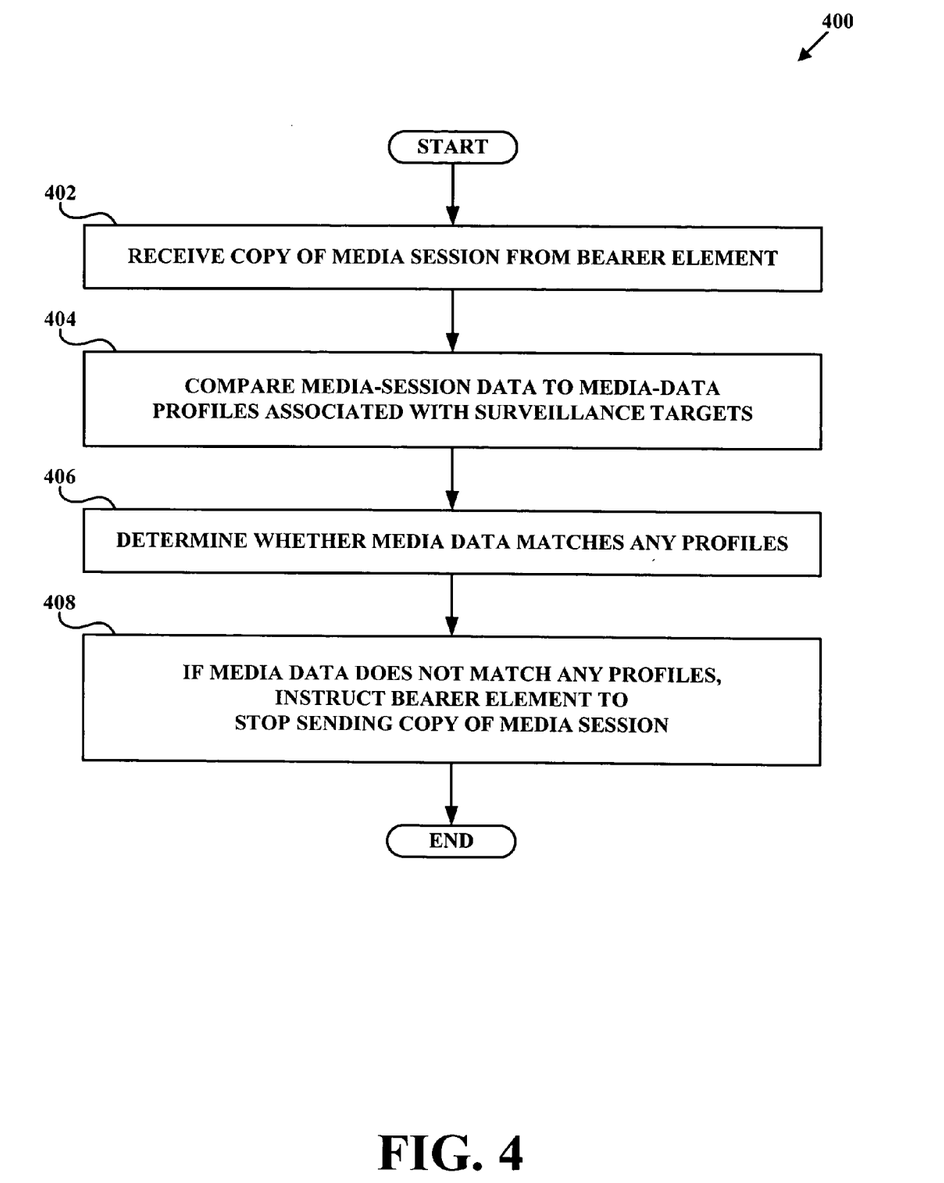
FIG. 4 is a flowchart of a first exemplary method that makes use of the communication system of FIG. 1, in accordance with exemplary embodiments.

FIG. 4 is a flowchart of a first exemplary method that makes use of the communication system of FIG. 1, in accordance with exemplary embodiments. As shown in FIG. 4, the method 400 begins at step 402, when media-analysis platform 108 receives at least one packet from bearer element 106. The at least one packet includes media data that represents a copy of at least part of a real-time media session. As described herein, bearer element 106 is configured to initially send to media-analysis platform 108 a copy of each of a plurality of media sessions that traverse bearer element 106. Bearer element 106 is further configured to stop sending a copy of a particular session in response to receiving an instruction from media-analysis platform 108.

At step 404, responsive to receiving the at least one packet, media-analysis platform 108 compares the media data of the media session to at least one media-data profile maintained by media-analysis platform 108. Each profile is associated with a target of surveillance. At step 406, media-analysis platform 108 makes a determination as to whether the media data matches any of the profiles. Finally, at step 408, if media-analysis platform 108 determines that the media data does not match any of the profiles, media-analysis platform 108 responsively sends an instruction to bearer element 106 to stop sending the copy of the media session. These steps are further explained in the following subsections.

i. Media-Analysis Platform Receives Copy of Real-Time Media Session from Bearer Element At step 402, media-analysis platform 108 receives at least one packet from bearer element 106. The at least one packet includes media data that represents a copy of at least part of a real-time media session. Again, bearer element 106 is configured to initially send to media-analysis platform 108 a copy of each of a plurality of media sessions that traverse bearer element 106. Bearer element 106 is further configured to stop sending a copy of a particular session in response to receiving an instruction from media-analysis platform 108.

The real-time media session may be or include any number of different types of media sessions. As examples, the media session could include a VoIP session, an RTP session, and/or a push-to-talk (PTT) session. And the set of media sessions—each of which bearer element 106 initially sends a copy of to media-analysis platform 108—could be defined in any number of ways. Some non-limiting, potentially-overlapping examples are: the set of all media sessions that originate in a particular geographic area, the set of all media sessions that terminate in a particular geographic area, the set of all media sessions that traverse bearer element 106, and the set of all media sessions that traverse some other bearer element. In the latter case, bearer element 106 could recognize all sessions that have traversed some other switch, router, etc., and responsively initially send a copy each of those sessions to media-analysis platform 108.

ii. Compare Media Data to Stored Media-Data Profiles

At step 404, responsive to receiving the at least one packet in step 402, media-analysis platform 108 compares the media data of the media session to at least one media-data profile maintained by media-analysis platform 108. Each such profile is associated with a target of surveillance. For example, the media session could be or include a VoIP session, and thus include voice data as some or all of the media data associated with the session. In that case, media-analysis platform 108 could compare that voice data with one or more voiceprints.

iii. Determine Whether Media Data Matches any Stored Profiles

At step 406, media-analysis platform 108 makes a determination as to whether the media data associated with the media session matches any of the stored media-data profiles. In the case of voice analysis, step 406 could involve media-analysis platform 108 comparing one or more phonemes detected as being spoken by a participant in the real-time media session against one or more digital representations of phonemes in one or more stored voiceprints. The number of phoneme matches—or the degree of matching as a general matter—between a voice in a media session and a voiceprint in data storage that must be reached for a voice to be considered to match a voiceprint is an implementation decision.

iv. If No Match is Found, Instruct Bearer Element to Stop Sending a Copy of that Particular Media Session At step 408, if media-analysis platform 108 determines that the media data associated with the particular media session does not match any of the stored media-data profiles (e.g. voiceprints), media-analysis platform 108 responsively sends an instruction to bearer element 106 to instruct bearer element 106 to stop sending the copy of that particular media session to media-analysis platform 108. As such, surveillance of that session will appropriately stop, as it has been determined that the session does not involve any targets of surveillance that are associated with media-data profiles stored by media-analysis platform 108.

If, however, a match is found between the media data of a particular media session and at least one stored media-data profile, then media-analysis platform 108 may responsively carry out one or more of the following actions: recording the media session, alerting a monitoring entity of the match between the media data and the one or more media-data profiles, and forwarding a copy of the media session to the monitoring entity. That monitoring entity could be associated with a law-enforcement agency such as a police department or the FBI, CIA, etc.

b. A Second Exemplary Method

Figure 5:
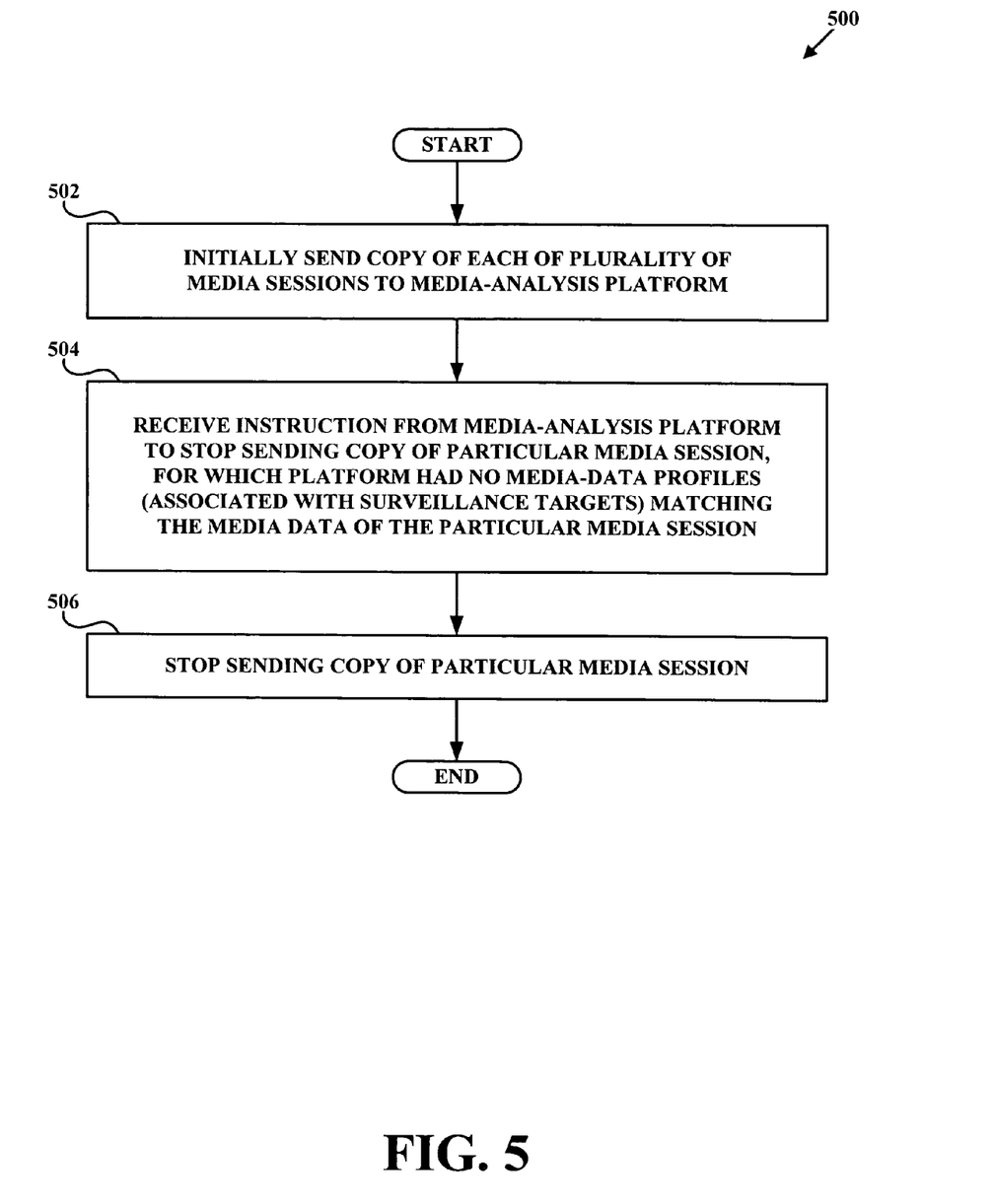
FIG. 5 is a flowchart of a second exemplary method that makes use of the communication system of FIG. 1, in accordance with exemplary embodiments.

FIG. 5 is a flowchart of a second exemplary method that makes use of the communication system of FIG. 1, in accordance with exemplary embodiments. The method 500 of FIG. 5 is similar in some respects to the method 400 of FIG. 4, and thus will not be described in as great of detail. As shown in FIG. 5, the method 500 begins at step 502, when bearer element 106 initially sends to media-analysis platform 108 a copy of at least part of each of a plurality of real-time media sessions that traverse bearer element 106. The copy of the at least part of each session includes media data associated with the respective session.

As described above, the plurality of real-time media sessions could, but would not necessarily, fit one or more of the following definitions: the set of all media sessions that traverse bearer element 106, the set of all media sessions that traverse some other bearer element, the set of all media sessions that originate in a particular geographic area, and the set of all media sessions that terminate in a particular geographic area. The plurality of media sessions could just as well fit some other definition.

At step 504, bearer element 106 receives an instruction from media-analysis platform 108 to stop sending a copy of a particular media session to media-analysis platform 108. This instruction is associated with media-analysis platform 108 determining that the media data of the particular session does not match any of the media-data profiles (e.g. voiceprints) maintained by media-analysis platform 108, where each profile is associated with a target of surveillance. As examples, the session could include a VoIP session, an RTP session, and/or a PTT session.

At step 506, responsive to receiving the instruction of step 504, bearer element 106 no longer sends the copy of the particular media session to media-analysis platform 108. That is, bearer element 106 stops sending the copy of that session to media-analysis platform 108. As such, surveillance of that session stops.

4. Conclusion

Various exemplary embodiments have been described above. Those skilled in the art will understand, however, that changes and modifications may be made to those examples without departing from the scope of the claims.

What is claimed is:

1. A method comprising:
a media-analysis platform receiving at least one packet from a bearer element, wherein the at least one packet comprises media data, the media data comprising voice data, representing a copy of at least part of a real-time media session, wherein the bearer element is configured to (i) initially send to the media-analysis platform a copy of each of a plurality of real-time media sessions, each such media session comprising voice communication, that traverse the bearer element and (ii) stop sending a copy of a particular such session to the media-analysis platform in response to receiving an instruction from the media-analysis platform;
responsive to receiving the at least one packet, the media-analysis platform comparing the voice data to at least one voice-data profile maintained by the media-analysis platform, wherein each such profile is associated with a target of surveillance;
the media-analysis platform determining whether the voice data matches any of the at least one voice-data profile; and
if the media-analysis platform determines that the voice data does not match any of the at least one voice-data profile, the media-analysis platform responsively sending an instruction to the bearer element to stop sending the copy of the media session to the media-analysis platform.

2. The method of claim 1, wherein the bearer element comprises at least one of a switch, a router, a media gateway, a media server, and a packet data serving node (PDSN).

3. The method of claim 1, wherein the plurality of media sessions that traverse the bearer element comprises at least one of (i) all real-time media sessions that traverse the bearer element, (ii) all real-time media sessions that traverse a second bearer element, (iii) all real-time media sessions that originate in a particular geographic area, and (iv) all real-time media sessions that terminate in a particular geographic area.

4. The method of claim 1, wherein the media session comprises at least one of a Voice over Internet Protocol (VoIP) session, a Real-time Transport Protocol (RTP) session, and a push-to-talk (PTT) session.

5. The method of claim 1, further comprising, if the media-analysis platform determines that the voice data does match at least one voice-data profile, the media-analysis platform responsively carrying out at least one of (i) recording the media session, (ii) alerting a monitoring entity of the match between the media data and the at least one voice-data profile, and (iii) forwarding a copy of the media session to a monitoring entity.

6. The method of claim 5, wherein the monitoring entity is associated with a law-enforcement agency.

7. A media-analysis platform comprising:
a communication interface;
a processor;
data storage comprising (i) at least one media-data profile, the media-data profile comprising a voice-data profile, wherein each profile is associated with a target of surveillance and (ii) program instructions executable by the processor to:
receive at least one packet from a bearer element, wherein the at least one packet comprises media data, the media data comprising voice data, representing a copy of at least part of a real-time media session, the real-time media session comprising voice communication, wherein the bearer element is configured to (i) initially send to the media-analysis platform a copy of each of a plurality of real-time media sessions that traverse the bearer element and (ii) stop sending a copy of a particular session to the media-analysis platform in response to receiving an instruction from the media-analysis platform;

responsive to receiving the at least one packet, compare the voice data to the at least one voice-data profile;

determine whether the voice data matches any of the at least one voice-data profile;

if the voice data does not match any of the at least one voice-data profile, responsively send an instruction to the bearer element to stop sending the copy of the media session to the media-analysis platform.

8. The media-analysis platform of claim 7, wherein the bearer element comprises at least one of a switch, a router, a media gateway, a media server, and a packet data serving node (PDSN).

9. The media-analysis platform of claim 7, wherein the plurality of media sessions that traverse the bearer element comprises at least one of (i) all real-time media sessions that traverse the bearer element, (ii) all real-time media sessions that traverse a second bearer element, (iii) all real-time media sessions that originate in a particular geographic area, and (iv) all real-time media sessions that terminate in a particular geographic area.

10. The media-analysis platform of claim 7, wherein the media session comprises at least one of a Voice over Internet Protocol (VoIP) session, a Real-time Transport Protocol (RTP) session, and a push-to-talk (PTT) session.

11. The media-analysis platform of claim 7, wherein the data storage further comprises program instructions executable by the processor to, if the voice data does match at least one voice-data profile, responsively carry out at least one of (i) recording the media session, (ii) alerting a monitoring entity of the match between the media data and the at least one voice-data profile, and (iii) forwarding a copy of the media session to a monitoring entity.

12. The media-analysis platform of claim 11, wherein the monitoring entity is associated with a law-enforcement agency.

13. A method comprising:

a bearer element initially sending to a media-analysis platform a copy of at least part of each of a plurality of real-time media sessions, each such real-time media session comprising voice communication, that traverse the bearer element, wherein the copy of the at least part of each real-time media session comprises media data associated with the at least part of the respective media session, wherein the media data comprises voice data;

the bearer element receiving from the media-analysis platform an instruction to stop sending a copy of a particular media session to the media-analysis platform, wherein the instruction is associated with the media-analysis platform determining that the voice data of the particular media session does not match any of at least one voice-data profile maintained by the media-analysis platform, wherein each voice-data profile is associated with a target of surveillance; and responsive to receiving the instruction, the bearer element no longer sending the copy of the particular media session to the media-analysis platform.

14. The method of claim 13, wherein the the media session comprises at least one of a Voice over Internet Protocol (VoIP) session, a Real-time Transport Protocol (RTP) session, and a push-to-talk (PTT) session.

15. The method of claim 13, wherein the bearer element comprises at least one of a switch, a router, a media gateway, a media server, and a packet data serving node (PDSN).

16. The method of claim 13, wherein the plurality of media sessions that traverse the bearer element comprises at least one of (i) all real-time media sessions that traverse the bearer element, (ii) all real-time media sessions that traverse a second bearer element, (iii) all real-time media sessions that originate in a particular geographic area, and (iv) all real-time media sessions that terminate in a particular geographic area.

* * * * *